C. H. MICKELSEN.
FARM WAGON.
APPLICATION FILED JULY 7, 1908.
944,891.
Patented Dec. 28, 1909.
2 SHEETS—SHEET 1.
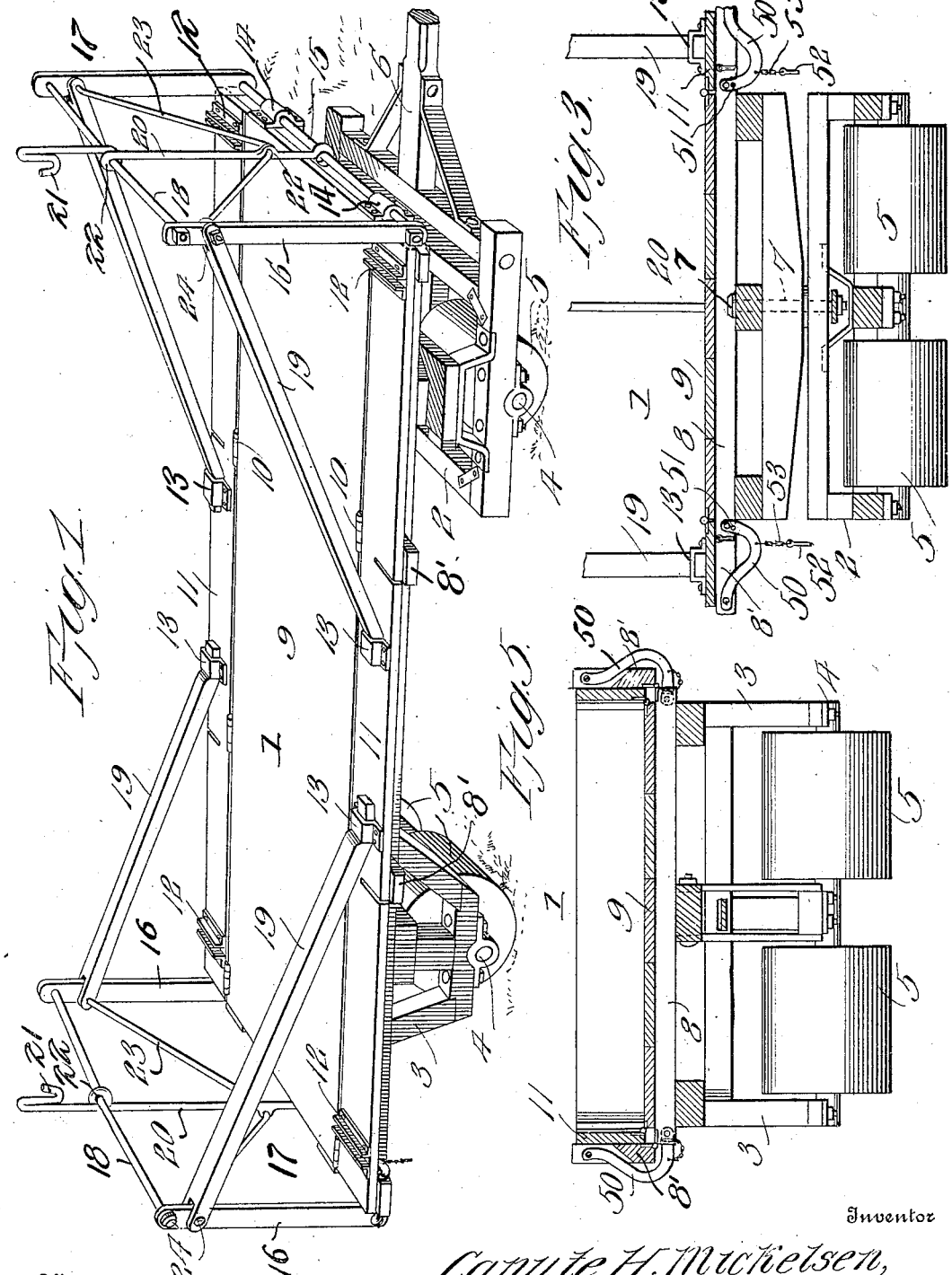
Witnesses
Frank Hough
Inventor
Canute H. Mickelsen,
By Victor J. Evans
Attorney C. H. MICKELSEN.
FARM WAGON.
APPLICATION FILED JULY 7, 1908.
944,891.
Patented Dec. 28, 1909.
2 SHEETS—SHEET 2.
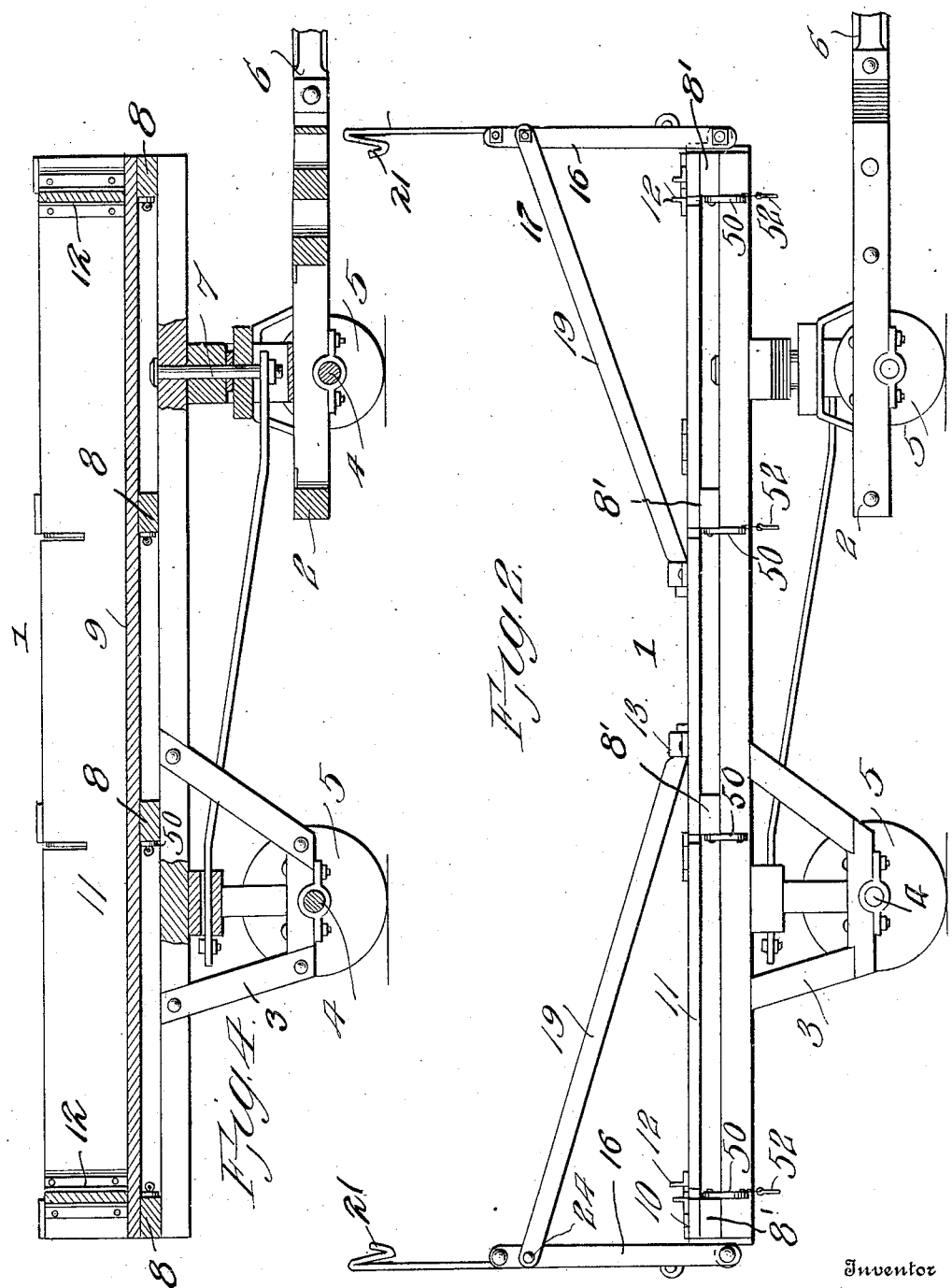
Witnesses
Frank Hough
Inventor
Canute H. Mickelsen,
By Victor J. Evans
Attorney

UNITED STATES PATENT OFFICE.

CANUTE H. MICKELSEN, OF BENCH, IDAHO.

FARM-WAGON.

944,891.

Specification of Letters Patent.　　Patented Dec. 28, 1909.

Application filed July 7, 1908.　Serial No. 442,290.

*To all whom it may concern:*

Be it known that I, CANUTE H. MICKELSEN, a naturalized citizen of the United States, residing at Bench, in the county of Bannock and State of Idaho, have invented new and useful Improvements in Farm-Wagons, of which the following is a specification.

This invention relates to farm wagons, and the object of the invention is to provide a wagon of this character having hinged sides which may be readily swung downwardly and a rack frame comprising front and rear portions positioned upon the wagon to convert the same from a box wagon to a hay wagon.

Another object of the invention is to provide a convertible wagon of this class with wide tread rollers mounted in suitable frames whereby the wagon may be drawn across various conditions of ground without danger of cutting the ground or of miring the wagon in soft ground.

With these and other objects in view the invention resides in the novel construction of elements and their arrangement in operative combination hereinafter fully described and claimed.

In the accompanying drawings, Figure 1 is a perspective view of a wagon constructed in accordance with the present invention, showing hinged sides lowered and the rack frames in position thereon. Fig. 2 is a side elevation of the same. Fig. 3 is a transverse sectional view of the same. Fig. 4 is a longitudinal section of the wagon body, the racks being removed and the sides in position. Fig. 5 is a transverse sectional view of the form illustrated in Fig. 4.

In the accompanying drawings, the numeral 1 designates the body of the improved wagon. This body 1 is provided with a front frame 2 and a rear frame 3. Both of the frames 2 and 3 are provided with suitable bearings adapted for the reception of transverse axles 4, and these axles 4 are adapted for the reception of suitable rollers 5. The front frame 2 is provided with a suitable tongue 6, and is connected with the body of the wagon by the king bolt 7, so as to allow for the turning of the device.

The frame of the wagon body 1 is provided with a plurality of cross beams 8, and upon these cross beams are positioned the bottom boards 9 of the wagon. These bottom boards 9 are provided with a plurality of hinges 10 by which the sides 11 of the wagon are connected, and the projecting portions of the cross beams 8 are adapted to serve as a support for the sides 11 when in their lowered position illustrated in Figs. 1, 2 and 3 of the drawings.

The sides 11 are provided with alining guide ways 12 positioned adjacent the ends of the sides. These guide ways may be constructed in any particular manner and of any material, and in the construction illustrated in the drawings they are each formed by a pair of L-shaped irons suitably spaced apart a distance approximately equaling the thickness of the front and back boards of the device. The sides 11 are also provided with ears 13, the purpose of which will hereinafter be described.

The front and rear of the wagon body are provided with suitable bearings 14, adapted for the reception of a transverse shaft 15. This shaft 15 has each of its ends attached to a vertical bar 16 of a rack frame 17. The vertical bars 16 are provided at their upper ends with a transverse connecting bar 18, and are also provided with the pivoted inclined bars 19 having their ends reduced and extended at an angle to engage the eyes 13 of the sides.

Centrally positioned between the shaft 15 and the rod 18 is an arm 20. This arm 20 is constructed preferably of metal, rounded in cross section and has its lower end bent to engage the shaft 15 while its upper portion is wound around the bar 18 and continued upwardly and bent upon itself to provide a hook 21. This hook 21 is adapted to serve as a means whereby a flexible element may be secured and attached to the hook at the opposite end of the wagon to effectively retain the contents of the wagon, such as hay, straw or the like in position upon the body of the wagon, the inclined bar 19 serving as an effective means for preventing the accidental displacement of the wagon's contents from the sides of the wagon.

The arm 20 may be provided with a perforated extension or ear 22, and this ear is adapted for the reception of a V-shaped bracing rod 23. The ends of this bracing rod 23 may be bent at a suitable angle and threaded whereby they may act as a fulcrum point or pivot for the inclined arms 19 at their point of connection with the vertical arms 16, suitable retaining threaded elements 24 being provided for securing the arms 19 to the threaded extensions of the V-shaped brace 23.

From the above description taken in connection with the accompanying drawings it will be seen that a device constructed in accordance with the present invention may be readily converted from a box wagon to a hay or other wagon requiring a wide base and racks for retaining the hay or similar material upon the body of the wagon. When it is desired to remove the racks from the body of the wagon the crook 21 is drawn away from the body of the wagon causing the arms 19 to become disengaged from the eyes 13, the shaft 15 is withdrawn from the bearings 14 and the rack members readily disconnected from the wagon body.

The beams 8 are provided with an extension 8′. These extensions are hingedly secured to the beams and are adapted to serve as a support for the sides 11 when in their lower position as illustrated in Figs. 1, 2 and 3 and to provide a reinforcement or brace for the sides when raised to provide a box wagon as illustrated in Figs. 4 and 5 of the drawings. Secured to the beams 8 and to the extension 8′ is a crooked retaining member 50. This member has its ends pivotally connected with the beam and the extension and is provided with a suitable perforation 51 adjacent its pivotal connection with the beam 8. This perforation 51 is adapted to aline with a similar perforation provided adjacent the ends of the beams 8 in a substantially horizontal plane with the pivots of the member 50. The member 50 is also provided with a suitable pin 52, normally retained suspended from the member 50 by the member 53. This pin 52 is adapted to be engaged by the perforation 51 and the opening provided in the beam 8 when the sides 11 are raised, as illustrated in Figs. 4 and 5 to normally maintain these sides in their raised position.

While I have described the preferred embodiment of the invention, as it now appears to me, it is to be understood that minor details of construction within the scope of the following claims may be resorted to without departing from or sacrificing any of the spirit of the invention.

Having thus fully described the invention what is claimed as new is:

1. A farm wagon having its frame provided with cross beams and pivoted sides, eyes upon the sides, bearings upon the front and rear of the wagon, shafts for the bearings, a vertical member upon each end of each of the shafts, a transverse member connecting each pair of vertical members, a central vertical member connected with each of the shafts and each of the transverse members, and having their extremities provided with hooks, an inclined bracing member connecting each of the central members and each of the two adjacent vertical members, said bracing members having their ends offset to provide extensions, an inclined side member connected with each of the said extensions, and said inclined members having their free ends offset and adapted to engage the eyes of the sides.

2. A farm wagon having its bottom provided with cross beams, an extending member hingedly connected with each of the beams upon each of their ends, a body upon the cross beams, a pair of side members each hingedly connected with the longitudinal edges of the body and adapted to rest upon the extending members of the cross beams, crooked arm members pivotally connected to each of the cross beams which latter are each provided with a perforation, the crooked arms being each provided with an opening adapted to aline with the opening of the cross beams when the sides are raised, and removable pin members adapted to engage the perforations of the arms and the cross beams to sustain the sides in their raised position.

In testimony whereof I affix my signature in presence of two witnesses.

CANUTE H. MICKELSEN.

Witnesses:
J. W. HUBBARD,
CHAS. SORENSEN.